United States Patent
Choudhary et al.

(10) Patent No.: US 11,550,723 B2
(45) Date of Patent: Jan. 10, 2023

(54) METHOD, APPARATUS, AND SYSTEM FOR MEMORY BANDWIDTH AWARE DATA PREFETCHING

(71) Applicant: QUALCOMM Incorporated, San Diego, CA (US)

(72) Inventors: Niket Choudhary, Bangalore (IN); David Scott Ray, Austin, TX (US); Thomas Philip Speier, Wake Forest, NC (US); Eric Robinson, Raleigh, NC (US); Harold Wade Cain, III, Raleigh, NC (US); Nikhil Narendradev Sharma, Apex, NC (US); Joseph Gerald McDonald, Raleigh, NC (US); Brian Michael Stempel, Raleigh, NC (US); Garrett Michael Drapala, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 200 days.

(21) Appl. No.: 16/113,185

(22) Filed: Aug. 27, 2018

(65) Prior Publication Data
US 2020/0065247 A1 Feb. 27, 2020

(51) Int. Cl.
*G06F 12/0862* (2016.01)
*G06F 12/0811* (2016.01)

(52) U.S. Cl.
CPC ...... *G06F 12/0862* (2013.01); *G06F 12/0811* (2013.01); *G06F 2212/1041* (2013.01); *G06F 2212/602* (2013.01)

(58) Field of Classification Search
CPC ............. G06F 9/30047; G06F 12/0862; G06F 12/0811; G06F 2212/1041; G06F 2212/602
See application file for complete search history.

(56) References Cited

U.S. PATENT DOCUMENTS

| | | | | |
|---|---|---|---|---|
| 6,470,427 B1 * | 10/2002 | Arimilli | ............... | G06F 12/0862 711/122 |
| 8,266,383 B1 * | 9/2012 | Minkin | .................. | G06F 12/084 711/125 |

(Continued)

OTHER PUBLICATIONS

International Search Report and Written Opinion—PCT/US2019/048208—ISA/EPO—dated Dec. 9, 2019.

*Primary Examiner* — Sanjiv Shah
*Assistant Examiner* — Alexander J Yoon
(74) *Attorney, Agent, or Firm* — Edward J. Meisarosh

(57) ABSTRACT

An apparatus, method, and system for memory bandwidth aware data prefetching is presented. The method may comprise monitoring a number of request responses received in an interval at a current prefetch request generation rate, comparing the number of request responses received in the interval to at least a first threshold, and adjusting the current prefetch request generation rate to an updated prefetch request generation rate by selecting the updated prefetch request generation rate from a plurality of prefetch request generation rates, based on the comparison. The request responses may be NACK or RETRY responses. The method may further comprise either retaining a current prefetch request generation rate or selecting a maximum prefetch request generation rate as the updated prefetch request generation rate in response to an indication that prefetching is accurate.

26 Claims, 5 Drawing Sheets

(56) References Cited

U.S. PATENT DOCUMENTS

| | | | |
|---|---|---|---|
| 2007/0220208 A1* | 9/2007 | Nomura | G06F 12/0862 711/137 |
| 2011/0113199 A1* | 5/2011 | Tang | G06F 12/0862 711/130 |
| 2011/0161587 A1* | 6/2011 | Guthrie | G06F 12/0862 711/122 |
| 2012/0246446 A1* | 9/2012 | Solihin | G06F 12/0802 712/205 |
| 2014/0108740 A1 | 4/2014 | Rafacz et al. | |
| 2016/0371187 A1* | 12/2016 | Roberts | G06F 12/0638 |
| 2017/0147493 A1* | 5/2017 | Eickemeyer | G06F 12/0862 |
| 2019/0012177 A1* | 1/2019 | Scalabrino | G06F 9/30138 |

* cited by examiner

METHOD, APPARATUS, AND SYSTEM FOR MEMORY BANDWIDTH AWARE DATA PREFETCHING

BACKGROUND

Field

Aspects of the present disclosure relate generally to prefetching, and more specifically to memory bandwidth aware data prefetching.

Background

Modern computing devices may employ a large number of individual processing cores or CPUs, which may in turn be able to service large numbers of instructions in a relatively short period of time. Supplying the CPUs with data and instructions on which to operate depends on the ability of the computing device to read data from and write data to a memory hierarchy, and in particular to a main memory or DRAM. In order to give each of the CPUs the largest window of instructions to select (and thus to continue forward program progress), the CPUs may be superscalar and/or out-of-order processors, and may each have their own cache hierarchy comprising multiple levels (e.g., L0, L1, and L2) of caches.

Despite the above-described techniques which may be employed to give each of the CPUs the largest number of possible instructions to select from in order to make forward progress without issuing read or write requests to a main memory, the rate at which the CPUs can issue contemporaneous read requests may be in excess of the capability of the main memory to service those requests (which is referred to as the memory bandwidth). Thus, overall system memory bandwidth is an important design challenge for high performance and high throughput processor designs.

One technique that may be employed to alleviate the problems associated with limited memory bandwidth is data prefetching. A computing device that employs data prefetching attempts to predict future memory accesses and issues requests corresponding to the predicted future memory accesses in advance of a specific request for that data. When such prefetching is accurate, it may serve to hide at least some of the memory access latency by requesting (and allowing a particular CPU to receive) data such that when the particular CPU needs the data to make forward progress, the data is already resident in the cache hierarchy of the particular CPU.

However, generating prefetch requests may increase the pressure on available memory bandwidth, as it involves additional bus traffic related to providing the prefetch requests to a main memory and returning the data associated with the prefetch request. If such prefetch requests are inaccurate (i.e., the data prefetched is not actually needed by the CPU receiving it) or untimely (i.e., the data prefetch could have been useful, but the prefetch was either too early or too late, and thus the CPU was not able to make optimal use of the prefetched data), prefetching can have a negative effect on overall system performance.

Thus, it would be desirable to implement a system for data prefetching that makes efficient use of available memory bandwidth by throttling prefetch requests when it is determined that the prefetch requests have a negative effect on overall system performance.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method comprises monitoring a number of request responses received in an interval at a current prefetch request generation rate. The method further comprises comparing the number of request responses received in the interval to at least a first threshold, and adjusting the current prefetch request generation rate to an updated prefetch request generation rate by selecting the updated prefetch request generation rate from a plurality of prefetch request generation rates, based on the comparison.

In another aspect, an apparatus comprises a prefetch block comprising a throttling block and a prefetch generation block coupled to the throttling block. The throttling block is configured to monitor a number of request responses received in an interval at a current prefetch request generation rate. The throttling block is further configured to compare the number of request responses received in the interval to at least a first threshold, and adjust the current prefetch request generation rate to an updated prefetch request generation rate by selecting the updated prefetch request generation rate from a plurality of prefetch request generation rates based on the comparison.

In yet another aspect, a non-transitory computer readable medium comprises instruction which, when executed by a processor, cause the processor to monitor a number of request responses received in an interval at a current prefetch request generation rate. The instructions further cause the processor to compare the number of request responses received in the interval to at least a first threshold, and adjust the current prefetch request generation rate to an updated prefetch request generation rate by selecting the updated prefetch request generation rate from a plurality of prefetch request generation rates, based on the comparison In yet another aspect, an apparatus comprises means for prefetching comprising means for prefetch throttling and means for prefetch generation coupled to the means for prefetch throttling. The means for prefetch throttling is configured to monitor a number of request responses received in an interval at a current prefetch request generation rate. The means for prefetch throttling is further configured to compare the number of request responses received in the interval to at least a first threshold, and adjust the current prefetch request generation rate to an updated prefetch request generation rate by selected the updated prefetch request generation rate from a plurality of prefetch request generation rates, based on the comparison.

One advantage of one or more disclosed aspects is that the disclosed aspects permit for data prefetching that is tailored to available memory bandwidth and is responsive to the relative accuracy of prefetching. In some aspects, this may decrease power consumption and improve system performance.

DETAILED DESCRIPTION

Aspects of the inventive teachings herein are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
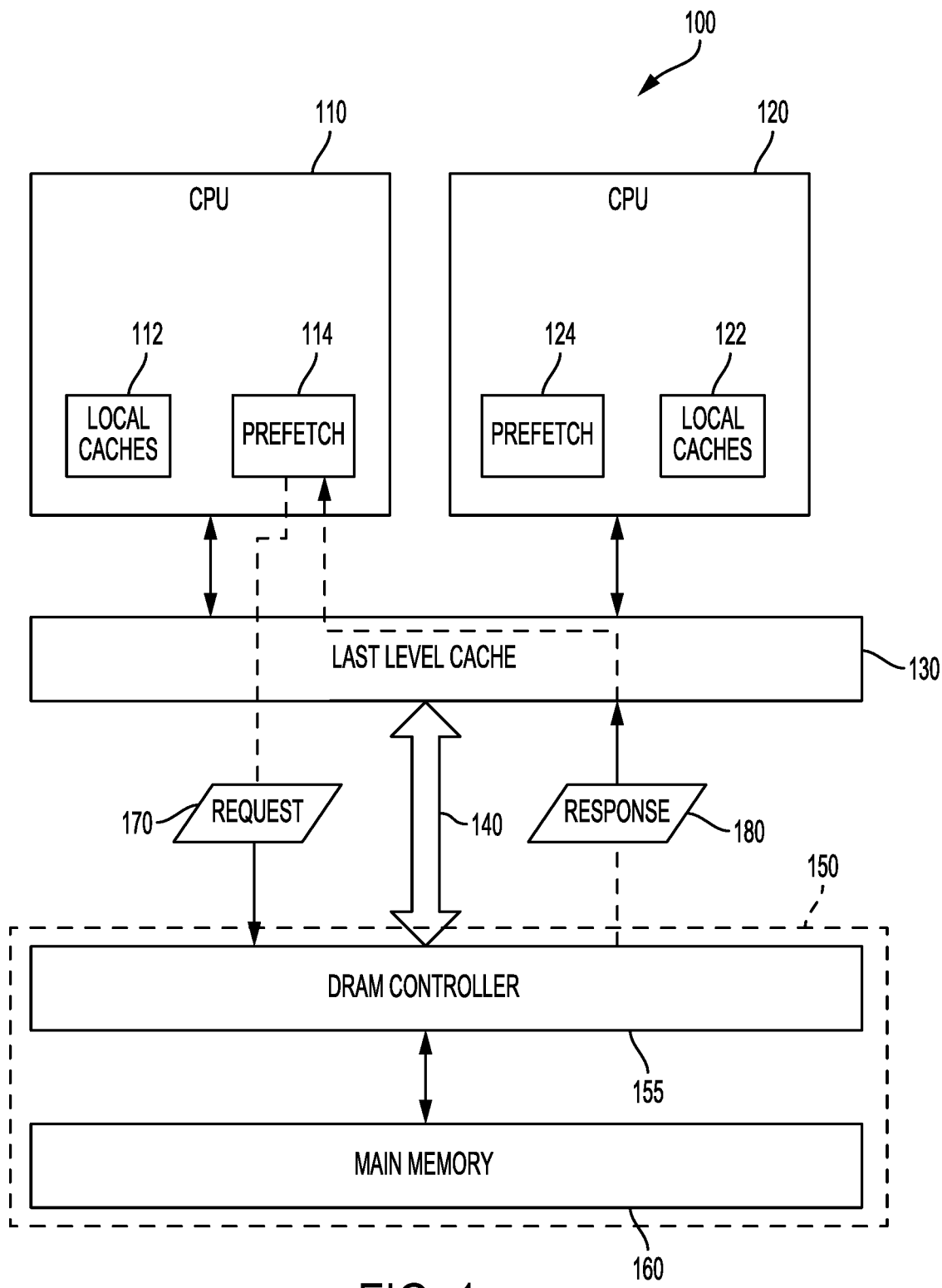
FIG. 1 shows a block diagram of a computing device configured to perform memory bandwidth aware data prefetching according to certain aspects of the present disclosure.

FIG. 1 shows a block diagram of a computing device 100 configured to perform memory bandwidth aware data prefetching according to certain aspects of the present disclosure. The computing device includes a first CPU 110 having local cache(s) 112 and a prefetch block 114 and a second CPU 120 having local cache(s) 122 and a prefetch block 124. Both the CPU 110 and the CPU 120 are coupled to a last level cache 130. In an exemplary aspect, each of local cache block 112 and local cache block 122 may comprise L0 data and instruction caches, a combined L1 cache, and a combined L2 cache. In a further exemplary aspect, the last level cache 130 may comprise an L3 cache. Those having skill in the art will recognize that many other cache configurations are possible, and the teachings of the present disclosure are not limited to the specific cache configuration discussed.

The last level cache 130 is coupled to a main memory system 150 via a system bus 140. The main memory system 150 comprises a DRAM controller 155 and a memory 160. The DRAM controller 155 is coupled to memory 160 and is configured to handle transactions to and from the main memory system 150, including prefetch requests as will be discussed further herein.

In one aspect, one or both of prefetch block 114 and 124 may be configured to issue prefetch requests at a current prefetch level in order to prefetch data from the main memory 160 into the last level cache 130, local cache(s) 112, and/or local cache(s) 122, in accordance with the teachings of the present disclosure. The DRAM controller 155 may be configured to receive the prefetch request 170 from prefetch block 114 or prefetch block 124 and may be further configured to send a request response 180 back to a respective requesting prefetch block 114 or 124. The request response 180 may be a prefetch non-acknowledgement response (NACK) or a retry response (RETRY). A NACK response indicates to the requesting entity (e.g., local cache 112, local cache 122, or last level cache 130) that the associated prefetch request will not be serviced, and the entity should not wait on the data associated with the prefetch. A RETRY response indicates that the main memory system 150 will not service the request at the present time, but the request may be re-submitted later (e.g., at a time chosen by the requestor).

As will be discussed with respect to FIGS. 2-4, the prefetching blocks are configured to receive and track the NACK and RETRY responses to their prefetch requests across a specified interval (which may be a programmable interval or may be fixed). The interval may be based on a certain number of events (e.g., a number of L2 cache allocations, or a number of prefetch requests presented), or may be time based. Based on the rates (i.e., the numbers of NACK and RETRY responses received) observed in the interval, the prefetching blocks 114 and 124 are configured to adjust their generation of prefetch requests (i.e., provide some degree of prefetch throttling) by comparing the rate of responses received with one or more request response thresholds, which are each associated with a prefetch request generation rate. Those having skill in the art will recognize that the number and type of thresholds is a matter of design choice. For example, there may be a single set of thresholds which counts NACK and RETRY responses together, there may a first set of thresholds associated with NACK responses and a second set of thresholds associated with RETRY responses, or there may be multiple sets of thresholds associated with each type of response based on other design considerations.

Likewise, each prefetch request generation rate may be established by adjusting different aspects of prefetch requests. In one aspect, prefetch request generation may be adjusted by selectively enabling or disabling prefetching at different cache levels. In another aspect, prefetch request generation may be adjusted by increasing or reducing the rate of prefetching at a specific cache level. In yet another aspect, prefetch request generation may be adjusted by generating prefetches in accordance with a specific set of algorithms, and changing which algorithm is applied. These aspects are by way of example only, and those having skill in the art will recognize that many ways of adjusting prefetch generation may be employed without departing from the scope of the teachings of the present disclosure. Further, as will be discussed with respect to FIG. 4, knowledge about the desirability of prefetching in particular code segments or programs, or knowledge regarding the overall accuracy of prefetching, may be used by the prefetching blocks 114 and 124 to over-ride the above-described use of request response thresholds to determine a prefetch request generation rate.

Figure 2:
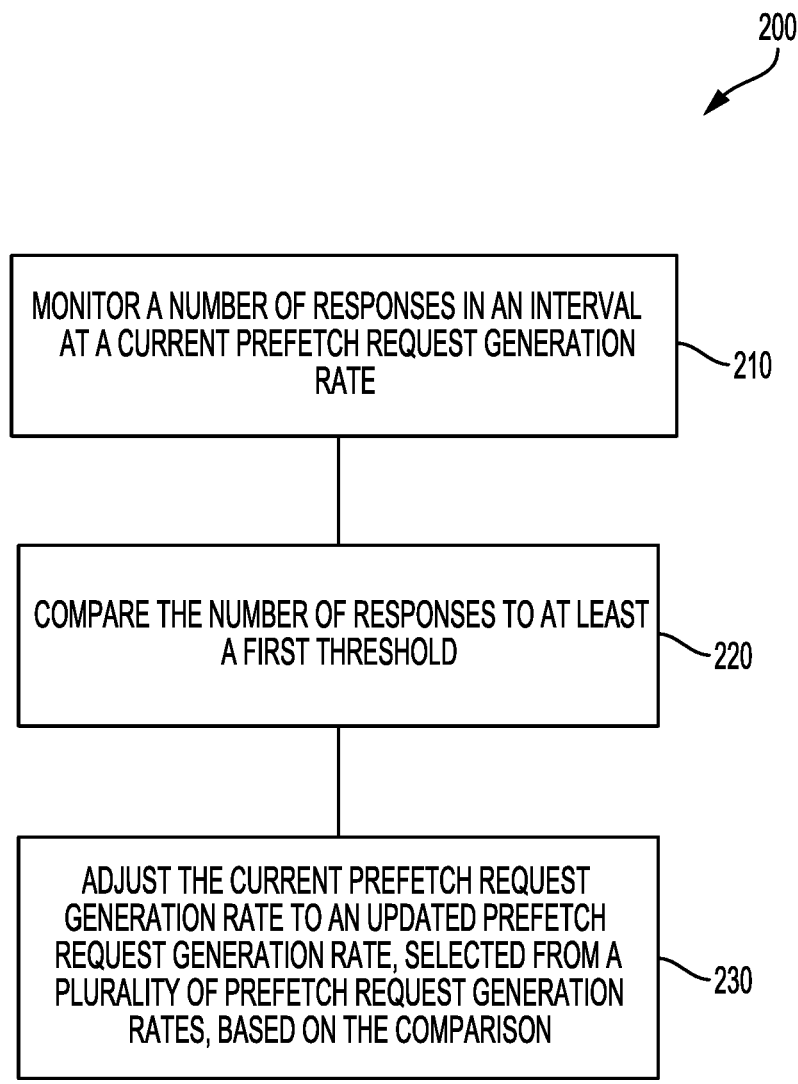
FIG. 2 shows a block diagram of a method of adjusting a prefetch level based on available memory bandwidth according to certain aspects of the present disclosure.

FIG. 2 shows a block diagram of a method 200 of adjusting a prefetch level based on available memory bandwidth according to certain aspects of the present disclosure. The method begins in block 210, by counting a number of request responses (i.e., NACKs and RETRYs, as discussed above) in an interval associated with a current prefetch request generation rate. For example, the prefetching block 114 may count a number of responses 180 received from the DRAM controller 155.

The method continues at block 220, where the number and type of request responses is compared to at least a first threshold. For example, the prefetch block 114 compares the number of NACK and RETRY responses to at least a first threshold. The method then continues in block 230, where the current prefetch request generation rate is adjusted to an updated prefetch request generation rate, selected from a plurality of prefetch request generation rates, based on the comparison. In one aspect, at least three distinct prefetch request generation rates are included, and at least two of the three distinct prefetch request generation rates allow the prefetch block 114 to generate prefetch requests (i.e., at least two of the three distinct prefetch request generation rates do not disable prefetching entirely). For example, if the current prefetch request generation rate is at a maximum level, and if the prefetch block 114 determines that the number of NACK and RETRY responses exceeds a first threshold number of responses permitted in order to generate prefetch requests at the maximum level, the prefetch block 114 may select an updated prefetch request generation rate that is less that the maximum level but still permits the prefetch block 114 to generate prefetch requests, based on the comparison.

Those having skill in the art will recognize that multiple thresholds, each correlated with a specific prefetch request generation rate, are possible, and that the thresholds may be determined based on a combination of NACK and RETRY responses. The specific number of NACK and RETRY responses is a matter of design choice and may be selected based on an analysis of the program to be run, expected data workload, or other such metadata. Such thresholds may be programmable by software, and may be dynamically adjustable during run-time. Further, as will be discussed with reference to FIG. 3, the selection of the updated prefetch request generation rate from the plurality of prefetch request generation rates may be done in a variety of ways.

Figure 3:
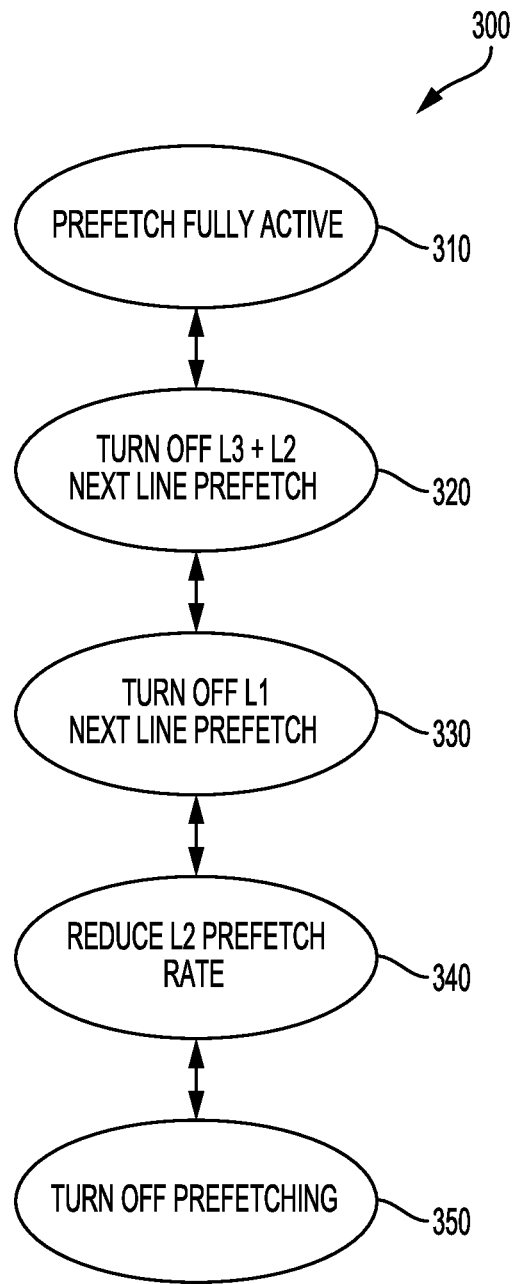
FIG. 3 shows a state diagram of a method of adjusting a prefetch request generation rate based on one or more thresholds according to certain aspects of the present disclosure.

FIG. 3 shows a state diagram 300 of a method of adjusting a prefetch request generation rate based on one or more thresholds according to certain aspects of the present disclosure. In an exemplary aspect, the prefetch block 114 or 124 may be configured to adjust their prefetch request generations rates based on the state diagram 300 (i.e., prefetch block 114 or 124 may implement the state diagram 300 as a finite-state machine). State diagram 300 illustrates five independent levels of prefetch request generation rate that may be selected by prefetch block 114 or 124 (e.g., by the method 200 illustrated in FIG. 2).

At a state corresponding to a highest prefetch request generation rate 310, prefetch request generation is fully active for all levels of cache (e.g., for CPU 110, local cache(s) 112 comprising an L1 and an L2 cache, and last level cache 130 comprising an L3 cache). At a state corresponding to a second-highest prefetch request generation rate 320, prefetching of expected next lines is turned off for the L3 and L2 cache but remains turned on for the L1 cache. At a state corresponding to a third-highest prefetch request generation rate 330, prefetching of expected next lines is turned off for the L1 cache as well. At a state corresponding to a second-lowest prefetch request generation rate 340, the rate of generation of prefetch requests for the L2 cache is reduced. Finally, at a state corresponding to a lowest prefetch request generation rate 350, all prefetching is turned off. As illustrated in FIG. 3, the states 310-350 should be understood to be inclusive of the states above them in level. For example, if the prefetch block 114 is in state 330, next line prefetch of the L3, L2, and L1 caches is turned off, since the level of prefetch throttling applied in state 330 is inclusive of that in state 320 (and state 310, although state 310 effectively corresponds to not applying any prefetch throttling). Those having skill in the art will recognize that this is merely incidental to the particular illustration of state diagram 300, and other arrangements of selecting prefetch request generation rates are possible.

Those having skill in the art will further recognize that, in combination with the plurality of thresholds discussed with respect to FIG. 2, movement between the states 310-350 may be done in different ways. In one aspect, movement between the states may be limited—for example, based on the number and type of responses receiving during the interval described in FIG. 2, prefetch block 114 may move up or down a specific number of states. For example, if only a single threshold is programmed, prefetch block 114 may move up or down one state in the state diagram 300 per interval. If two thresholds are programmed, prefetch block 114 may move up or down one or two states in the state diagram 300 per interval. Alternatively, prefetch block 114 may have a table of thresholds, each threshold corresponding to one of the states 310-350 in the state diagram 300, and may directly select any of the states 310-350 based on a comparison of the number and type of responses received during the interval and the table of thresholds. These aspects are merely exemplary, and those having skill in the art will recognize that many other specific implementations of movement between states and thresholds are possible and are within the scope of the teachings of the present disclosure.

Figure 4:
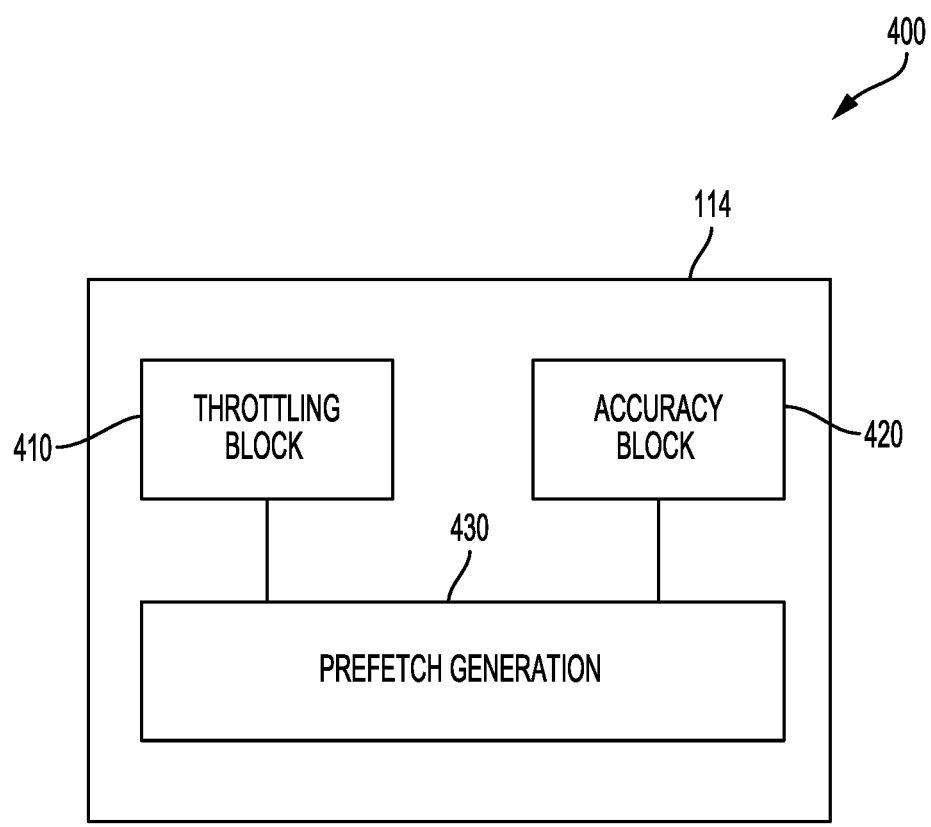
FIG. 4 shows a block diagram of a prefetch block of a CPU configured to perform memory bandwidth aware data prefetching according to certain aspects of the present disclosure.

FIG. 4 shows a block diagram 400 of a prefetch block of a CPU configured to perform memory bandwidth aware data prefetching according to certain aspects of the present disclosure. In one aspect, the prefetch block may be the prefetch block 114 (or the prefetch block 124) of the computing device 100 of FIG. 1. The prefetch block 114 comprises a throttling block 410, which may operate substantially in accordance with the method 200 of FIG. 2 and/or the state diagram 300 of FIG. 3 and may provide a proposed prefetch request generation rate (e.g., selected from the state diagram 300 of FIG. 3) to a prefetch request generation block 430, which is configured to generate the prefetch requests and provide them to a main memory system. The prefetch block 114 further optionally comprises an accuracy block 420 configured to evaluate the overall accuracy of prefetches and for times or code segments where prefetches are known to be very accurate, may issue an over-ride signal to the prefetch request generate block 430 to indicate that no prefetch throttling should be applied. In response to such an indication that prefetching is accurate, in some aspects the prefetch block 114 may either retain a current prefetch generation rate (i.e., will not apply further throttling regardless of what the throttling block 410 proposes) or may select a maximum prefetch generation rate.

Figure 5:
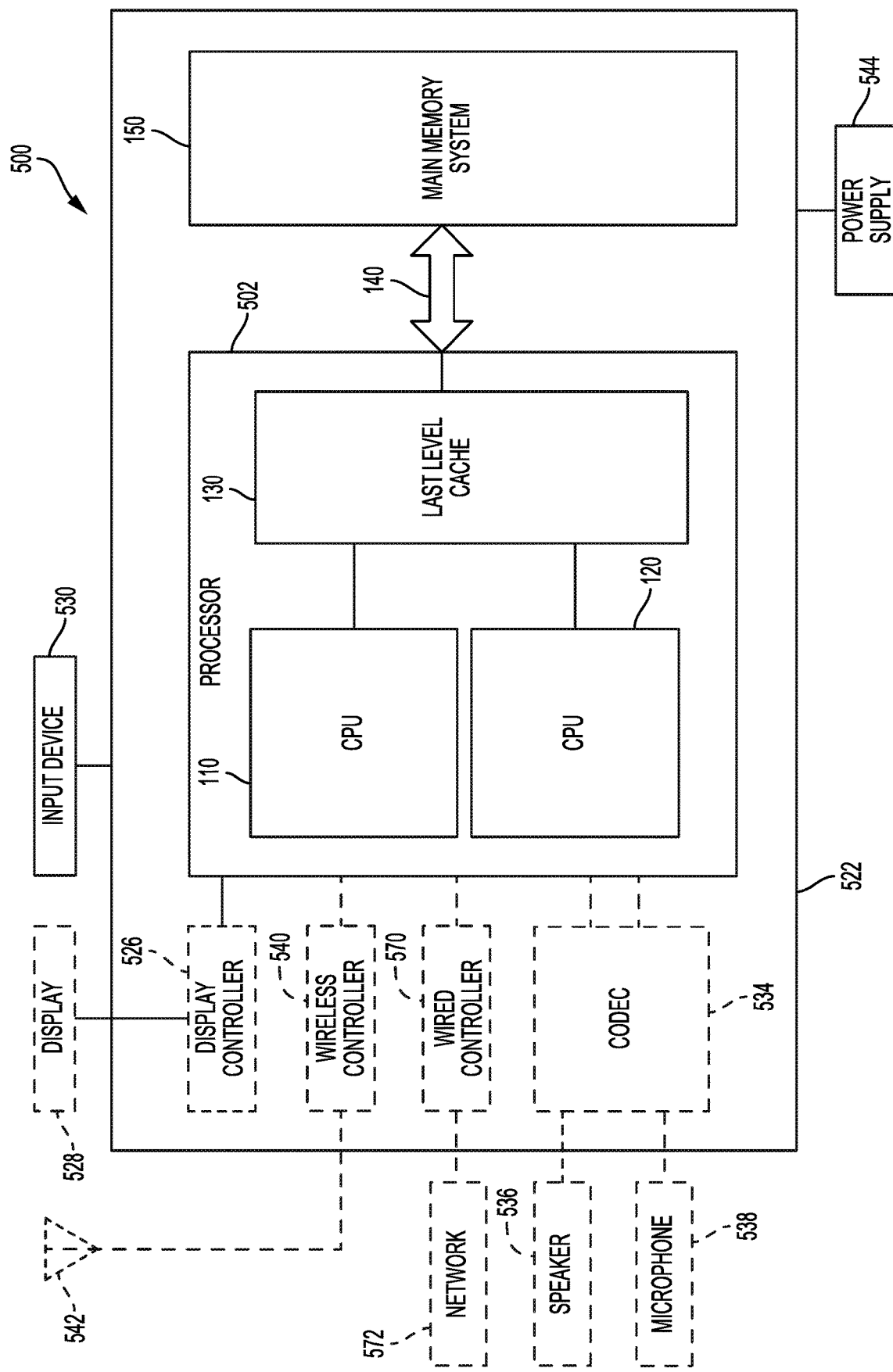
FIG. 5 shows a system-level diagram of a computing device configured to perform memory bandwidth aware data prefetching according to certain aspects of the present disclosure.

An example apparatus in which aspects of this disclosure may be utilized will now be discussed in relation to FIG. 5. FIG. 5 shows a diagram of a computing device 500 incorporating a structure for memory bandwidth aware data prefetching as described with respect to FIG. 1 and FIG. 4, and which may be operable in accordance with the method described in FIG. 2 and the prefetch request generation state machine 300 illustrated in FIG. 3. In that regard, the system 500 includes the processor 502 which may incorporate the CPU 110, the CPU 120, the last level cache 130 substantially as described with regard to FIGS. 1 and 2. The system 500 further includes the main memory system 150 coupled to the processor 502 via the system bus 140. The main memory system 150 may further store non-transitory computer-readable instructions that, when executed by the processor 502, may perform the method 200 of FIG. 2, or may cause a prefetch block associated with CPU 110 or CPU 120 to generate prefetch requests in accordance with the prefetch request generation state machine 300 illustrated in FIG. 3.

FIG. 5 also shows optional blocks in dashed lines, such as coder/decoder (CODEC) 534 (e.g., an audio and/or voice CODEC) coupled to processor 502, speaker 536, and microphone 538; and wireless antenna 542 coupled to wireless controller 540 which is coupled to processor 502. Further, the system 502 also shows display controller 526 that is coupled to processor 502 and to display 528, and wired network controller 570 coupled to processor 502 and to a network 572. Where one or more of these optional blocks are present, in a particular aspect, processor 502, display controller 526, memory 532, and wireless controller 540 may be included in a system-in-package or system-on-chip device 522.

Accordingly, a particular aspect, input device 530 and power supply 544 are coupled to the system-on-chip device 522. Moreover, in a particular aspect, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 generally depicts a computing device, the processor 502 and the main memory system 150 may also be integrated into a mobile phone, a communications device, a computer, a server, a laptop, a tablet, a personal digital assistant, a music player, a video player, an entertainment unit, and a set top box, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method, comprising:
generating prefetch requests, for prefetching data into a cache, at a current prefetch request generation rate;
monitoring a number of request responses received from a memory controller in an interval at the current prefetch request generation rate, wherein the request responses indicate that the associated prefetch requests will not be serviced;
comparing the number of request responses received from the memory controller in the interval to at least a first threshold number of request responses; and
adjusting the current prefetch request generation rate to an updated prefetch request generation rate by selecting the updated prefetch request generation rate from a plurality of prefetch request generation rates, based on the comparison.

2. The method of claim 1, wherein:
the plurality of prefetch request generation rates comprise at least three prefetch request generation rates;
two of the three prefetch request generation rates permit the generation of prefetch requests; and
one of the three prefetch request generation rates is a lowest prefetch request generation rate at which all prefetching is turned off.

3. The method of claim 2, wherein each of the plurality of prefetch request generation rates is associated with one of a plurality of thresholds, and wherein selecting the updated prefetch request generation rate comprises choosing one of the plurality of prefetch request generation rates based on comparing the number of request responses received in the interval to the plurality of thresholds.

4. The method of claim 2, wherein selecting the updated prefetch request generation rate comprises selecting either a next higher prefetch request generation rate or next lower prefetch request generation rate, based on comparing the number of request responses received in the interval to the first threshold.

5. The method of claim 2, wherein selecting the updated prefetch request generation rate comprises retaining a current prefetch request generation rate when either the prefetch request generation rate is a highest prefetch request generation rate and less prefetch throttling is desired, or the prefetch request generation rate is the lowest prefetch request generation rate and more prefetch throttling is desired.

6. The method of claim 1, further comprising generating new prefetch requests based on the updated prefetch request generation rate.

7. The method of claim 1, further comprising receiving an indication that prefetching is accurate and retaining a current prefetch request generation rate as the updated prefetch request generation rate, independent of the comparison.

8. The method of claim 1, further comprising receiving an indication that prefetching is accurate and adjusting the current prefetch request generation rate to a maximum prefetch request generation rate, independent of the comparison.

9. The method of claim 1, wherein the request responses comprise NACK-type responses indicating that associated prefetch requests will not be serviced and that data associated with the prefetch requests should not be awaited.

10. The method of claim 1, wherein the request responses comprise RETRY-type responses, indicating that associated prefetch requests will not be serviced at the present time but may be resubmitted later.

11. The method of claim 1, wherein the request responses from the memory controller comprise both:
NACK-type responses indicating that associated prefetch requests will not be serviced by the memory controller and that data associated with the prefetch request should not be awaited; and
RETRY-type responses, indicating that associated prefetch requests will not be serviced by the memory controller at the present time but may be resubmitted later.

12. The method of claim 1, further comprising, if the number of request responses received in the interval is greater than the first threshold number of request responses, then turning off prefetching of expected next lines for a higher-level cache while keeping on prefetching of expected next lines for a local cache.

13. An apparatus comprising a prefetch block comprising a throttling block and a prefetch generation block coupled to the throttling block, wherein:
the prefetch generation block is configured to generate prefetch requests, for prefetching data into a cache, at a current prefetch request generation rate;
the throttling block configured to:
monitor a number of request responses received in an interval at the current prefetch request generation rate, wherein the request responses indicate that the associated prefetch requests will not be serviced;
compare the number of request responses received in the interval to at least a first threshold number of request responses; and
adjust the current prefetch request generation rate to an updated prefetch request generation rate by selecting the updated prefetch request generation rate from a plurality of prefetch request generation rates based on the comparison.

14. The apparatus of claim 13, wherein:
the plurality of prefetch request generation rates comprise at least three prefetch request generation rates;
two of the three prefetch request generation rates permit the generation of prefetch requests; and
one of the three prefetch request generation rates is a lowest prefetch request generation rate at which all prefetching is turned off.

15. The apparatus of claim 14, wherein each of the plurality of prefetch request generation rates is associated with one of a plurality of thresholds, and wherein selecting the updated prefetch request generation rate comprises choosing one of the plurality of prefetch request generation rates based on comparing the number of request responses received in the interval to the plurality of thresholds.

16. The apparatus of claim 15, wherein the plurality of thresholds are programmable by software.

17. The apparatus of claim 14, wherein selecting the updated prefetch request generation rate comprises selecting either a next higher prefetch request generation rate, or next lower prefetch request generation rate, based on comparing the number of request responses received in the interval to the first threshold.

18. The apparatus of claim 14, wherein selecting the updated prefetch request generation rate comprises retaining a current prefetch request generation rate when either the prefetch request generation rate is a highest prefetch request generation rate and less prefetch throttling is desired, or the prefetch request generation rate is the lowest prefetch generation rate and more prefetch throttling is desired.

19. The apparatus of claim 13, wherein the prefetch generation block is configured to generate new prefetch requests based on the updated prefetch request generation rate.

20. The apparatus of claim 13, the prefetch block further comprising an accuracy block configured to provide an over-ride signal to the prefetch generation block to avoid prefetch throttling.

21. The apparatus of claim 20, wherein the prefetch generation block is configured to retain the current prefetch request generation rate as the updated prefetch request generation rate based on the over-ride signal and independent of the updated prefetch request generation rate selected by the throttling block.

22. The apparatus of claim 20, wherein the prefetch generation block is configured to select a maximum prefetch request generation rate as the updated prefetch request generation rate based on the over-ride signal and independent of the updated prefetch request generation rate selected by the throttling block.

23. The apparatus of claim 13, integrated into a computing device.

24. The apparatus of claim 23, the computing device further integrated into a device selected from the group consisting of a mobile phone, a communications device, a computer, a server, a laptop, a tablet, a personal digital assistant, a music player, a video player, an entertainment unit, and a set top box.

25. The apparatus of claim 13, further comprising a local cache and a higher-level cache, wherein the apparatus is further adapted to turn off prefetching of expected next lines for the higher-level cache while keeping on prefetching of expected next lines for the local cache if the number of request responses received in the interval is greater than the first threshold number of request responses.

26. A non-transitory computer readable medium comprising instructions which, when executed by a processor, cause the processor to:
 generate prefetch requests, for prefetching data into a cache, at a current prefetch request generation rate;
 monitor a number of request responses received in an interval at the current prefetch request generation rate, wherein the request responses indicate that the associated prefetch requests will not be serviced;
 compare the number of request responses received in the interval to at least a first threshold number of request responses; and
 adjust the current prefetch request generation rate to an updated prefetch request generation rate by selecting the updated prefetch request generation rate from a plurality of prefetch request generation rates, based on the comparison.

\* \* \* \* \*